Aug. 21, 1923.
G. McNEILL.
1,465,648
QUICK ACTING AND ATTACHABLE VALVE
Filed April 22, 1920
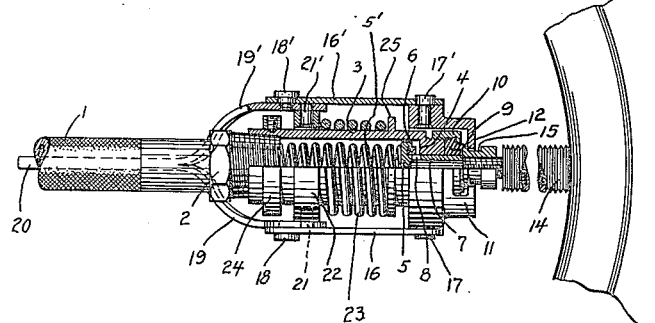
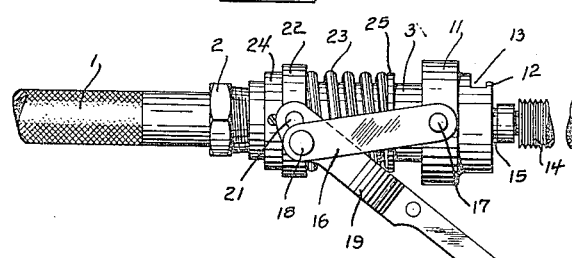
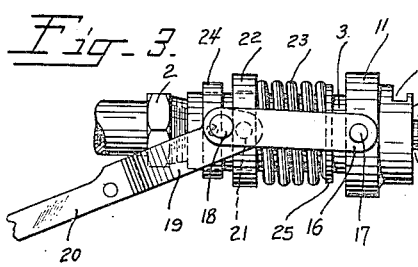
Inventor
GEORGE McNEILL
By his Attorney
Ernest Hopkinson Patented Aug. 21, 1923.

1,465,648

UNITED STATES PATENT OFFICE.

GEORGE McNEILL, OF DETROIT, MICHIGAN, ASSIGNOR TO MORGAN & WRIGHT, A CORPORATION OF MICHIGAN.

QUICK ACTING AND ATTACHABLE VALVE.

Application filed April 22, 1920. Serial No. 375,712.

*To all whom it may concern:*

Be it known that I, GEORGE McNEILL, a citizen of the United States, residing at Detroit, county of Wayne, and State of Michigan, have invented certain new and useful Improvements in Quick Acting and Attachable Valves, of which the following is a full, clear, and exact description.

This invention relates to valves, and particularly to a quick acting and attachable type thereof suitable for supplying air to inflatable articles.

In testing casings of pneumatic tires after their manufacture and before shipment, it is desirable to inflate inner tubes therewithin to a certain pressure in order to discover if present, latent defects such as would not be apparent in the non-inflated casing. In such testing an inner tube, substantially deflated, is positioned within the shoe or casing and then inflated. After examination the tube is then deflated and removed.

The present invention aims to provide a new and improved type of valve suited especially for the above mentioned work, but also useful for other and analogous purposes. For one thing it aims to make the valve quickly attachable and detachable. For another, it aims to establish communication between a source of fluid pressure supply and an article without manipulation additional to its attachment, and preferably by admitting the fluid under pressure to the article substantially simultaneously with its attachment.

Briefly, the invention consists in providing a valve with a closure member and a clamp which latter is adapted to grip the stem of the ordinary tire valve, and in the gripping displace an inner valve within the attachment so as to establish communication between a source of fluid under pressure and a tire or other article.

The invention is illustrated in the accompanying drawings in which

Fig. 1 shows the valve attachment in quarter section mounted on a nipple and with the parts in a position permitting passage of fluid under pressure.

Fig. 2 shows the valve in elevation at right angles to Fig. 1 with the clamp operating mechanism in a released or open position opposite to that shown in Fig. 1.

Fig. 3 illustrates more clearly the toggle action of the clamp shifting devices and Fig. 4 is an end elevation of the attachment.

In the drawings, a flexible conduit 1 is shown coupled by a threaded member 2 to one end of a tubular or otherwise suitably apertured valve body 3, whose opposite end is provided internally with a shoulder or seat 4 for a closure member or plug 5 normally held against the seat by a compression spring 5'. The plug 5 is provided with a washer 6 and in its hollow stem 7 with ports 8 for establishing communication between the interior of the valve body and of the plug stem when the latter is unseated. When the plug 5 is seated on the shoulder 4 to close passage of fluid through the valve, the one end of its stem 7 projects free beyond the valve body and also beyond a yielding member or cushion 9 in the form of a rubber washer which is held in position by a flanged ferrule 10 threaded or otherwise secured to the exterior of the valve body.

Externally, and adjacent the plug stem 7, the valve body has loosely sleeved thereon a clamp 11 with an inturned flange 12 provided with an open ended or U-shaped slot 13 extending across the axis of the valve body. The clamp is shiftable to grip or release a nipple 14 provided, preferably, with a slot or groove 15, or otherwise fashioned to be pulled upon by the clamp 11 for effecting attachment of the valve to a nipple. When the clamp is shifted to grip the end of the nipple between its flange 12 and the cushion 9, the projecting end of the stem 7 is engaged by the nipple and the plug lifted from its seat on shoulder 4 and against the action of its impelling spring 5'.

The clamp 11 may be shifted by any suitable means, but preferably, as shown, by links 16—16' at one end pivoted on pins 17—17' and their opposite ends on pins 18—18'. The latter are mounted in levers 19—19' which may be provided, if desired, with a common operating handle 20 and with fulcrums 21—21' on a ring 22. The latter is loosely sleeved on the exterior of the valve body 3 and is normally held by a spring 23 (stronger than spring 5') against a collar 24 fixed to the valve body. Spring 23 is coiled about the body and reacts against a flange or abutment 25 integral with the valve body. The interconnected links 16—16' and arms of the bell crank levers 19—19' function as toggles when shifted from the position shown in Fig. 2 to the position shown in both Figs. 1 and 3, in their shifting movement the fulcrums 21—21' move to and slightly across the lines between the pivots at the opposite ends of the links 16—16'.

With the handle 20 in the position shown in Fig. 2 the clamp 11 is spaced sufficiently from the cushion 9 to be readily engaged over the end of the tire nipple 14. By the single manual operation required to shift the handle from the position shown in Fig. 2 to that shown in Fig. 3 the flanges 12 of the clamp pull the valve body and tire nipple together against the free projecting end of the stem 7 and also against the yielding cushion 9. And thus communication is established between the interior of the valve body 3 and of the nipple 14 through the aperture in the stem 7 and ports 8 therein. Thus in one operation the valve is attached to the article to be inflated and air or other fluid under pressure supplied to the valve body may pass into the article.

The above description refers to a preferred form of the invention suitable for testing tire casings after their manufacture but it will be obvious that many changes can be made in the details and construction without departing from the principles thereof. Obviously the clamp may be variously shaped to grip the end of a nipple, which latter need not necessarily have its ends altered if the clamp 11 is suitably shaped. Reference should, therefore, be made to the accompanying claims for an understanding of the scope of the invention.

Having thus described my invention what I claim and desire to protect by Letters Patent is:

1. A valve having relatively movable telescoping body and clamp portions, a spring actuated plug normally closing the passage through the body, a toggle linkage anchored at one end to said clamp portion, yieldable fulcrums for the other end of said toggle linkage, and means for operating said toggle linkage to attach and open the valve or to detach and close the valve relative to a nipple on a hollow article.

2. A valve having a hollow body with an internal seat, a clamp sleeved on the body, a plug sleeved within the body having ports and a free end projecting beyond the body, a spring member holding said plug against said seat to close the passage in the body and with the projecting free end of the plug immediately adjacent said clamp, links pivoted at spaced points to said clamp, a lever loosely pinned to said links, and a spring actuated fulcrum for said lever shiftable to opposite sides of a link.

3. A valve having a hollow body, means for stopping passage of fluid through the hollow body including a spring-pressed closure member, in combination with a clamp for engaging a nipple and having inturned and opposed gripping portions disposed at substantially right angles to the axis of the valve body, and means for simultaneously shifting the clamp and closure member axially of the valve body to grip a nipple and establish communication between it and the interior of the valve body, the whole being bodily movable laterally for the purpose of aligning the passage in the body with that in the nipple preliminary to a gripping operation.

4. A valve having a tubular body with an internal seat, a clamp sleeved on the body, a plug sleeved within the body, a spring member holding said plug against said seat to close the passage in the body and with a projecting free end of the plug adjacent said clamp, a ring sleeved on said body, a spring urging said ring axially of the body, means fixed to the body for eliminating displacement of the ring by the spring, and levers fulcrumed on said ring and pivoted to said links so that the clamp may be operated to lock the valve to a nipple and place the valve and nipple in communication.

Signed at Detroit, Mich., this 10th day of April, 1920.

GEORGE McNEILL.